Patented May 12, 1925.

1,537,571

UNITED STATES PATENT OFFICE.

ERNST ZEHNTNER AND ERNST BODMER, OF BASEL, SWITZERLAND, ASSIGNORS TO SOCIETY DURAND & HUGUENIN S. A., OF BASEL, SWITZERLAND.

MORDANT DISAZODYESTUFFS.

No Drawing.    Application filed November 26, 1923.   Serial No. 677,121.

*To all whom it may concern:*

Be it known that we, ERNST ZEHNTNER and ERNST BODMER, both citizens of the Swiss Republic, and residents of Basel, Switzerland, have invented new and useful Improvements Relating to Mordant Disazodyestuffs, of which the following is a full, clear, and exact specification.

The United States Patent 1,075,134 discloses the manufacture of yellow mordant disazodyestuffs by coupling tetrazotized benzidine-2:2'-disulfonic acid with an ortho-hydroxy-carboxylic acid of the benzene series such as salicylic acid or ortho-cresotinic acid.

Now we have found that new useful dyestuffs are obtained by replacing salicylic acid or ortho-cresotinic acid by those homologues of salicylic acid which have the alkyl groups in another position than in the ortho-position to the hydroxyl group, that is to say, in meta-position or in para-position.

Some of these new dyestuffs yield redder and more intense tints in wool dyeing by the afterchroming process. Others give in cotton printing a totally different shade as compared with the dyestuffs of the said United States Letters Patent.

Such homologues of salicylic acid are:

1. Xylenol-carboxylic acid corresponding to the formula:

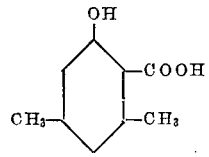

This body has never been used for coupling with diazo compounds. The dyestuff obtained with this body according to the present invention gives in wool dyeing by the afterchroming process and also in cotton printing with chrome mordant yellowish brown tints.

2. Meta-cresotinic acid of the formula:

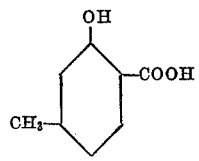

The dyestuff obtained with meta-cresotinic acid yields in wool dyeing by the afterchroming process a redder and more intense tint than the dyestuff made according to the United States Patent 1,075,134.

3. Para-cresotinic acid of the formula:

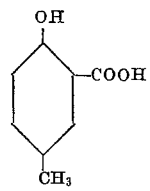

The dyestuff obtained with this body gives in cotton printing yellowish brown tints.

The benzidine-disulfonic acid can also be replaced by the tolidine-disulfonic acid corresponding to the formula:

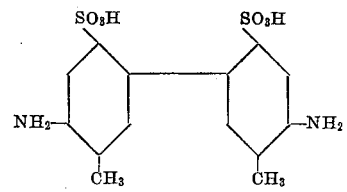

Example 1.

34.4 kilos of benzidine-2:2'-disulfonic acid are dissolved in 300 liters of water with the aid of 10.6 kilos of calcined sodium carbonate. After addition of a concentrated solution of 14 kilos of sodium nitrite, the whole is poured into a mixture of 50 kilos of hydrochloric acid of 22° Bé. and of 50 kilos of ice, while stirring well and maintaining the temperature at about 13–15° C. The greater of the tetrazodiphenyldisulfonic acid separates. When the diazotation is finished, stirring is continued for some time and then the thin paste is introduced into a cold solution of 35 kilos of xylenolcarboxylic acid and 40 kilos of calcined sodium carbonate in 150 kilos of water. The coupling is finished in the known manner by addition of caustic soda solution and the dyestuff is salted out, filtered and dried.

The new dyestuff—the sodium salt of the body—is a reddish brown powder easily soluble in water. In concentrated sulfuric acid it gives an orange colored solution, while the corresponding dyestuff resulting from salicylic acid gives a pure yellow solution.

On chromium mordanted wool the coloring matter yields yellowish brown tints. With chromium mordants there are produced in cotton printing yellowish brown tints of good fastness.

By replacing the benzidine-disulfonic acid by the corresponding quantity of toluidine-disulfonic acid a dyestuff is obtained with similar properties.

Example 2.

In an analogous manner a dyestuff can be produced by combining the tetrazodiphenyl-disulfonic acid obtained from 34.4 kilos of benzidine-disulfonic acid with 31 kilos of meta-cresotinic acid. This dyestuff—in the form of the sodium salt—is an orange colored powder which is also easily soluble in water.

On wool by the afterchroming process it gives very intense and reddish yellow, in cotton-printing with chrome mordant bright golden yellow tints of good fastness.

Example 3.

In a similar manner as described in Example 1, a dyestuff is obtained by combining the tetrazo-derivative of 34.4 kilos of benzidine-disulfonic acid with 31 kilos of para-cresotinic acid.

This dyestuff—in the form of the sodium salt—constitutes a reddish brown powder easily soluble in water.

In cotton-printing with chrome mordant the dyestuff yields yellowish brown tints fast to soap and chlorine.

What we claim is:—

1. The herein described process for the manufacture of new mordant disazodyestuffs consisting in combining a tetrazoderivative of 4:4'-diamino-diaryl-2:2'-disulfonic acid with such homologues of salicylic acid that have the alkyl groups in another position than in the ortho-position to the hydroxyl group.

2. The herein described process for the manufacture of new mordant disazo-dyestuffs having probably the following formula:

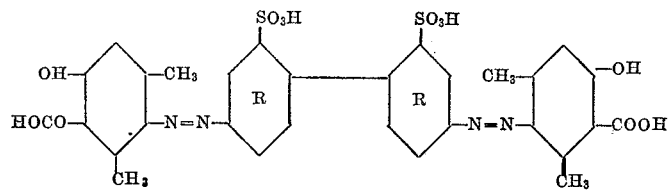

where R is an aromatic nucleus which, apart form the herein mentioned substituents, is capable of carrying further ones, said process consisting in combining one molecule of a tetrazo-derivative of 4:4'-diamino-diaryl-2:2'-disulfonic acid with two molecules of xylenol-carboxylic acid corresponding to the formula:

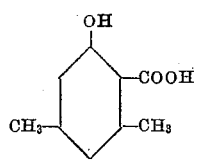

3. As new articles of manufacture, the herein described mordant disazo-dyestuffs obtained by combining a tetrazo-derivative of 4:4'-diamino-diaryl-2:2'-disulphonic acid with such homologues of salicylic acid, which have the alkyl-group in another position than in the ortho-position to the hydroxyl group, constituting orange or reddish-brown powders, easily soluble in water, which in chromium mordant wool dyeing and in cotton printing give bright golden yellow to yellowish brown tints.

In witness whereof we have hereunto signed our names this 15 day of November, 1923, in the presence of two subscribing witnesses.

ERNST ZEHNTNER.
ERNST BODMER.

Witnesses:
AMAND FRANZ,
MADELINE SPENGLER.